April 26, 1960  F. HUHN  2,933,930
INDEXING MECHANISM
Filed July 20, 1959  2 Sheets-Sheet 1

INVENTOR.
FRITZ HUHN
BY
ATTORNEY.

April 26, 1960

F. HUHN 2,933,930

INDEXING MECHANISM

Filed July 20, 1959

INVENTOR.
FRITZ HUHN
BY Philip Sutkow
Max Geldin
ATTORNEY.

United States Patent Office

2,933,930
Patented Apr. 26, 1960

2,933,930

INDEXING MECHANISM

Fritz Huhn, South Pasadena, Calif.

Application July 20, 1959, Serial No. 828,348

10 Claims. (Cl. 74—129)

This invention relates to an indexing device designed to produce intermittent rotation of a shaft through predetermined equal angles, for performing certain machine operations on a work piece.

In various types of operations on a work piece such as a screw, the machine for carrying out these operations comprises a rotatable dial on which a number of work pieces or screws are positioned, for rotating the work pieces intermittently from one station to another at which the various work operations on the respective work pieces or screws are performed.

It is an object of this invention to design an indexing mechanism for intermittently rotating a work piece holder through a number of angles from one work station to the next.

Another object is to provide an indexing mechanism for the above service, including means for intermittently rotating a shaft through a predetermined series of equal angles.

Still another object is the provision of an indexing mechanism of the above type designed to rapidly rotate a shaft in intermittent fashion through a number of equal angles in timed sequence, and including means to positively index and lock the mechanism at each indexing station, without producing backlash.

A still further object is to design an indexing mechanism having the above characteristics, and of relatively simple construction.

Other objects and advantages will appear from the following description.

According to the invention the indexing device hereof comprises a pair of like adjacent polygonal members, mounted on a shaft. Such members are keyed to the shaft for rotation thereof, said members being offset from each other by an angle equal to one half of one of the angles of the polygon. A slide is provided which is reciprocable in a straight line motion in a plane substantially normal to said shaft. The slide has a pair of straight cam surfaces spaced from each other, said surfaces being disposed parallel to each other and perpendicular to the direction of reciprocation of said slide. One of said cam surfaces is positioned to contact the respective outer edges of one of said polygonal members, the other of said cam surfaces being positioned to contact the respective outer edges of the other polygonal member. A pair of spring loaded interferences are mounted on opposite sides of said slide at an angle to the direction of reciprocation thereof. The first spring loaded interference cooperates with the respective side edges of one of the polygonal members for rotating said member through an angle equal to one half of one of the angles of said polygon during reciprocation of the slide in one direction, the second spring loaded interference cooperating with the respective side edges of the other polygonal member for rotating such member through an angle equal to one half of one of the angles of said polygon during reciprocation of said slide in the opposite direction. Means are provided for reciprocating the slide to cause the cam surfaces on the slide to alternately engage a side edge of one of the polygonal members following rotation thereof by the first interference, and a side edge of the other polygonal member following rotation thereof by the second interference.

The respective side edges of the polygonal members contact the above noted cam surfaces of the slide in flat positive engagement at each terminus of reciprocation of the slide, and afford a rapid stop without backlash, which maintains the mechanism fixed and motionless during a predetermined dwell period before the slide is again reciprocated in the opposite direction.

The invention will be understood more clearly from the description below of a preferred embodiment, taken in connection with the accompanying drawings wherein.

Figure 4:
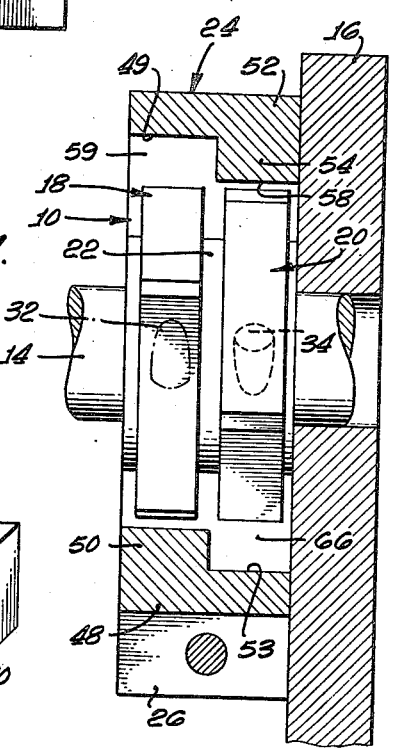
Fig. 4 is a section taken on line 4—4 of Fig. 2.
Figure 5:
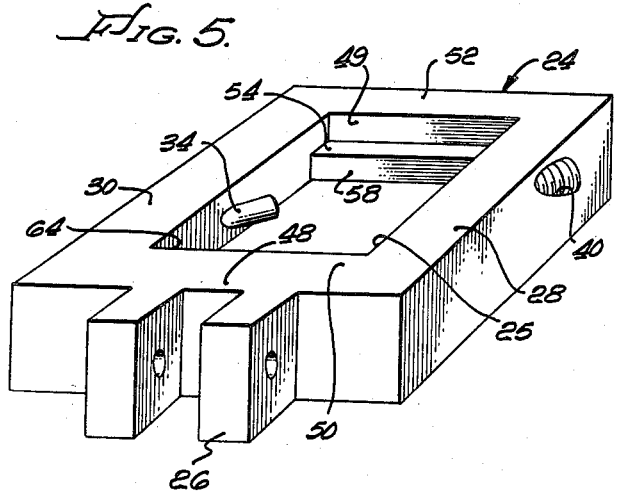
Fig. 5 is a perspective view of the slide.

Referring to the drawing, numeral 10 represents a stop gear unit which is mounted on a shaft 14 supported for rotation in a base plate 16 (see Fig. 4). The shaft is connected to a dial plate (not shown) on which a work piece such as a screw is mounted and on which work operations are to be performed at a plurality of equally spaced stations adjacent the periphery of the dial plate.

The stop gear 10 is formed of a pair of like substantially square cam plates 18 and 20 positioned closely adjacent each other, such plates being parallel to each other and positioned perpendicular to the axis of the shaft 14. It will be noted that the cam plates 18 and 20 are offset from each other an angle equal to one half of each angle of the polygons 18 and 20. Since the polygons forming cam plates 18 and 20 are squares and each angle of the polygon is 90°, the angle of offset of the square cam plates from each other is 45°. Plates 18 and 20 are integrally mounted on a hub 22, said hub being keyed at 12 to the shaft 14 for rotation of said shaft by said cam plates, as will be described below.

A slide 24 in the form of a rectangular frame has a rectangular central aperture 25 within which the stop gear 10 is positioned. Slide 24 is mounted for reciprocable movement on base plate 16 in a plane perpendicular to the axis of shaft 14. Such reciprocable movement of slide 24 is produced by a power piston (not shown) connected to a yoke 26 mounted on the lower cross piece 48 of the slide frame 24. In the opposite side arms 28 and 30 of slide 24, are mounted a pair of identical spring urged slidable interferences or pins 32 and 34, respectively, each pin disposed inwardly toward the stop gear 10. These pins are positioned at equal angles to the direction of reciprocation of slide 24 and are parallel to each other. In this embodiment the pins 32 and 34 are each positioned at an angle of 45° to the direction of reciprocation of the slide 24. In the position of the slide shown in Fig. 1, it will be noted that the side of pin 32 rests along and parallel to a side edge 31 of cam plate 18, and the end of pin 34 is positioned closely adjacent the side edge 33 of cam plate 20.

The structure mounting each of pins 32 and 34 is the same, and hence the description of the mounting of pin 32 will suffice. Pin 32 is positioned for slidable movement in an angular bore 35 formed in the side arm 28 of slide 24. The pin has connected at its outer end a flange 36 mounted for slidable movement in an angular pocket 44 coaxially positioned with respect to bore 35. The flange 36 and pin 32 are urged inwardly toward the stop gear 10 by a compression spring 38 abutting the flange 36 and a collar 40 threaded at 42 in the outer portion of pocket 44. The spring 38 is positioned about a stud 46 axially positioned in pocket 44 and integrally connected to the flange 36. Collar 40 has a central axial bore 47 which receives the outer end of stud 46 to guide stud 46 for axial movement in pocket 44. The pin 32 and its associated spring structure described above are mounted in the side arm 28 so that pin 32 is in alignment with the front cam plate 18, and the other pin 34 and its associated spring structure are mounted in side arm 30 in a position offset from the position of pin 32 and its associated structure, so that pin 34 is in alignment with the other rear cam plate 20.

It will be noted that the lower cross piece 48 of the slide frame 24, viewing Figs. 1 and 4, has a thickened portion 50 disposed adjacent front cam plate 18, and the upper cross piece 52 of the slide frame has a thickened portion 54 offset from thickened portion 50, and disposed adjacent the other rear cam plate 20, for a purpose pointed out hereinafter. The rectangular opening 25 in the slide 24 has a width between side arms 28 and 30, slightly greater than the diagonal distance across the square cam plates 18 and 20, so that the corners of said cam plates will clear said side arms when the cam plates are rotated from the position shown in Fig. 1 to that shown in Fig. 3. The distance between the thickened portion 50 of cross piece 48 (see Fig. 4), and the opposite recessed portion 49 of cross piece 52, and the distance between the thickened portion 54 of cross piece 52 and the opposite recessed portion 53 of cross piece 48, are substantially equal, and such distance is substantially greater than the diagonal distance across the cam plates 18 and 20, as seen in Figs. 1 to 4, to permit transverse movement of the slide the required predetermined amount free from contact with the corners of the square cam plates as the latter are rotated.

Figure 1:
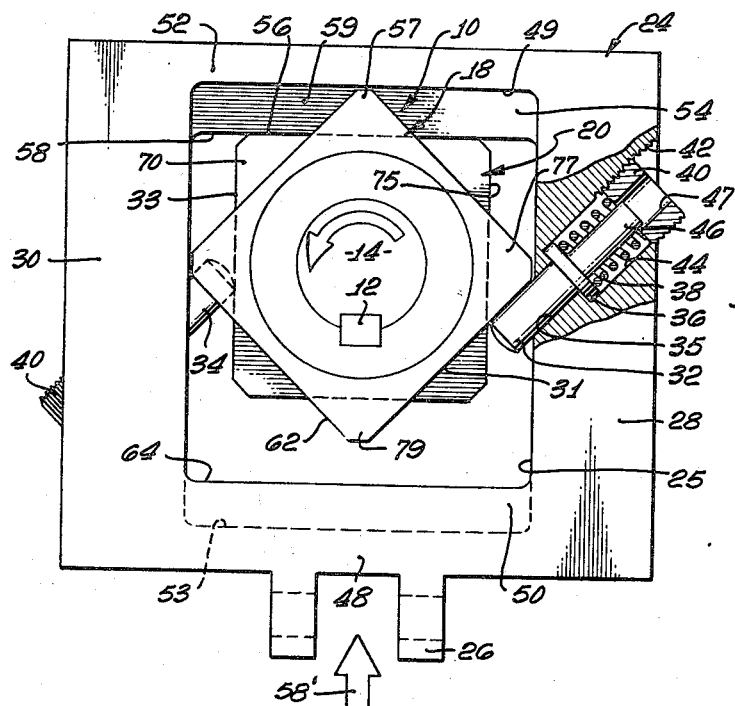
Fig. 1 is a plan view of the indexing mechanism, partly in section, showing the position of the square cams when the slide is in one extreme position.

In operation, at the extreme downward position of the slide 24, as shown in Fig. 1, the upper side edge 56 of the rear cam plate 20 is in fixed flat abutting relation with the cam surface 58 of the rear thickened portion 54 of the upper slide cross piece 52, and the adjacent corner 57 of cam plate 18 is disposed in the recess 59 adjacent the thickened portion 54 of the slide cross piece 52, but out of contact with recessed surface 49 of cross piece 52. In this fixed position, a work operation is being carried out at one station on a work piece such as a screw mounted on the aforementioned dial plate (not shown). In timed sequence following completion of such work operation, the power piston (not shown) connected to the yoke 26 is automatically actuated to reciprocate the slide 24 upward in the direction indicated by arrow 58' in Fig. 1. As the slide moves from the position shown in Fig. 1 to the intermediate position shown in Fig. 2, the pin 32 moves upwardly with the slide and abuts the side edge 31 of the front cam plate 18, imparting a counter-clockwise moment to said cam plate and causing counter-clockwise rotation thereof, together with the rear cam plate 20 and shaft 14, to the position of the cam plates shown in Fig. 2. During this period of motion of the slide 24, the opposite pin 34 is compressed by abutment of the pin against the adjacent side edge 33 of the rear cam plate 20 as result of counter-clockwise rotation of cam plate 20. Also, during this period of motion of slide 24, the side edge 56 of the rear cam plate 20 loses contact with and is rotated away from the adjacent cam surface 58 of the slide to its position shown in Fig. 2, and corner 57 of front plate 18 moves away from the adjacent inner recessed surface 49 of cross piece 52.

Figure 2:
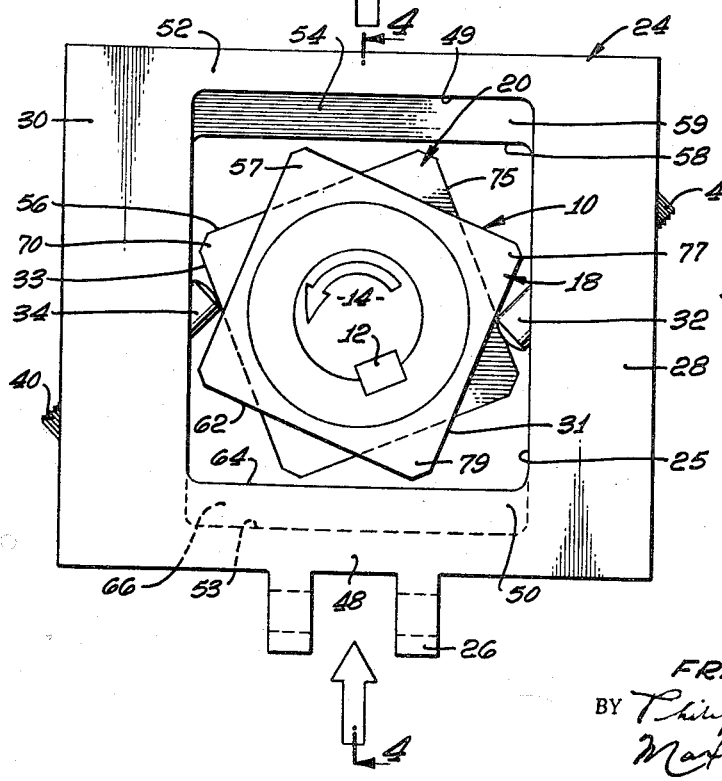
Fig. 2 is a plan view similar to Fig. 1, showing the position of the square cams when the slide is moved to an intermediate position.
Figure 3:
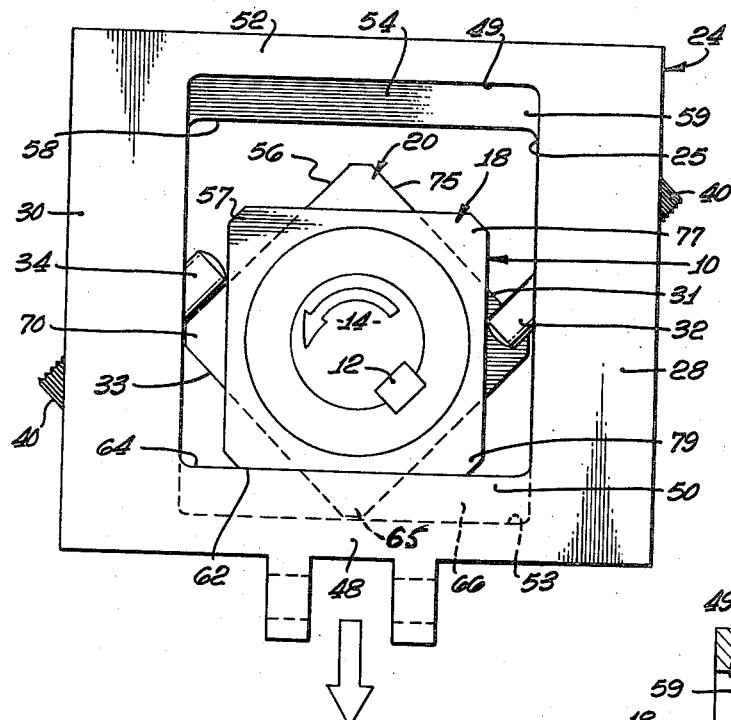
Fig. 3 is a plan view similar to Figs. 1 and 2, showing the position of the square cams when the slide is moved to its extreme opposite position from its position shown in Fig. 1.

As the slide 24 continues to move upward from its position in Fig. 2 to its extreme upper position shown in Fig. 3, pin 32 continues to move upward in abutting relation with the side edge 31 of the front cam palte 18, causing said cam plate 18 to continue its counter-clockwise rotation, together with the rear cam plate 20 and the shaft 14. When the slide 24 has reached its extreme upper position shown in Fig. 3, the side edge 62 of the front cam plate is placed in flat abutting relation with cam surface 64 of the thickened portion 50 of the lower slide cross piece 48, at which time the adjacent corner 65 of the rear cam plate 20 is disposed in the recess 66 adjacent thickened portion 50, but free from contact with the recessed surface 53. This rotation of cam plates 18 and 20 through an angle of 45° from the position shown in Fig. 1 to the position shown in Fig. 3, produces a 45° rotation of shaft 14 to place the work piece at the next work station disposed 45° away from the previous work station along the periphery of the aforementioned dial. It is seen that when surface 62 of cam plate 20 is cammed against the surface 64 of the slide, the shaft 14 is placed in an exact predetermined position and no further movement or backlash of the shaft can occur.

During the period of motion of the slide from the position in Fig. 2 to the extreme position shown in Fig. 3, the pin 34 is further compressed against the side edge 33 of the rear cam plate 20, as result of further counter-clockwise rotation of such cam plate. However, just about the time that cam surface 62 makes contact with the slide surface 64, the corner 70 of the rear cam plate 20 passes the pin 34, causing said pin to snap outward along the adjacent side edge 56 of the rear cam plate 20 to the position shown in Fig. 3. It should also be noted that all during rotation of the front cam plate 18 from the position shown in Fig. 1 to the position shown in Fig. 3, pin 32 remains in its fully extended outward position and continues to function in such extended position during such period of rotation, to produce a full 45° rotation of cam plate 18, together with cam plate 20 and shaft 14. It will be seen that the pins 32 and 34 in Fig. 3 occupy reversed positions with respect to their adjacent cam plates 18 and 20, from the positions occupied by these pins in Fig. 1.

After a predetermined period of time following completion of a work operation at the various stations along the dial, the slide 24 is reciprocated downwardly from its upper position shown in Fig. 3 back to its lowermost position shown in Fig. 1. During this movement of slide 24, the cam surface 64 of the slide is first moved away from the abutting side edge 62 of the front cam plate 18, and movement of pin 34 downwardly with the slide produces a counterclockwise moment on the rear cam plate 20 as a result of abutment of pin 34 with side edge 56 of cam plate 20, causing counterclockwise rotation of rear cam plate 20, front cam plate 18 and the shaft 14, in the same manner as described above with respect to rotation of cam plate 18 by pin 32. As the slide moves downwardly, pin 32 is increasingly compressed against the adjacent side edge 31 of the front cam plate, just as pin 34 was previously compressed against the adjacent side edge 33 of the rear cam plate 20 during upward movement of the slide, as previously described. At the downward terminus of movement of the slide, the rear cam plate 20 has been rotated counter-clockwise 45° by pin 34 from the position of plate 20 shown in Fig. 3 to its position shown in Fig. 1, and the side edge 75 of cam plate 20 is now placed in flat abutting relation with the cam surface 58 of the thickened slide cross piece portion 54, bringing the shaft 14 to a positive fixed position displace 45° from its previous position. During this period of downward movement of slide 24, the front cam plate 18 of course also is rotated counter-clockwise 45° from its position shown in Fig. 3 to a position as shown in Fig. 1, with the corner 77 of plate 18 now disposed in the recess 59 adjacent the thickened cross piece portion 54. Just as this position of the cam plate 18 is reached, the adjacent lower corner 79 of plate 18 clears the end of pin 32, and the latter snaps outwardly to its fully extended position along side edge 62 of cam plate 18. The slide 24, cam plates 18 and 20, and pins 32 and 34 are now again in the position shown in Fig. 1.

By again repeating the above described cycle of upward and downward movement of slide 24 in timed sequence by the attached power means or piston, cam plates 18 and 20 are again rotated counterclockwise, in two additional 45° intermittent movements, to cause corresponding intermittent 45° rotations of shaft 14. Such rotation of the shaft produces a like intermittent rotation of the aforementioned dial on which a work piece or screw is mounted, to place the work piece at adjacent successive work stations positioned at 45° intervals about the periphery of the dial. At each 45° interval of movement of shaft 14 by the cam plates, the mechanism provides a positive rapid cessation of movement of the shaft without backlash, permitting the work operations to be carried out on the work piece at each work station without any danger of displacement of the work piece during its dwell period at the respective work stations. In the instant embodiment employing square cam plates 18 and 20, it will be noted that eight intermittent stops are provided, spaced at 45°, for servicing eight work stations at corresponding 45° angles from each other about the dial.

Although I have described and shown an indexing mechanism having square cam plates, it will be understood that said cam plates can take the form of any regular polygon, such as a triangle or a pentagon, provided both cam plates in each instance have like polygonal configurations. Under these circumstances, the respective polygonal plates should be offset an angle equal to one half that of each angle of the polygon. For example, in the case of triangular cam plates formed of equilateral triangles, the adjacent cam plates should be offset 60° from each other, and in the case of regular pentagonal cam plates, these should be offset 36° from each other. Of course the interferences or pins on the slide, which function to rotate the respective cam plates as described above, should also be positioned at the proper angle in relation to the side edges of the adjacent cooperating polygonal cam plates, so as to function to rotate the respective plates through the proper angle during each reciprocation of the slide. In the case of triangular cam plates, the angle through which the plates are rotated between stops would be 60°, and for pentagonal plates, such angle would be 36°, in each instance such angle of rotation between stops being equal to half of each angle of the polygon.

From the foregoing it is seen that I have designed a relatively simple and readily constructed indexing mechanism for positively indexing and locking a work piece carrier at predetermined angles of rotation of the carrier, in the absence of backlash or vibration of the carrier, and permitting work operations to be accomplished at each work station while the work carrier is maintained in positive immovable position.

While I have described a preferred embodiment of my invention for purposes of illustration thereof, it is to be understood that various modifications and adaptations thereof may be made within the spirit of the invention as set forth in the appended claims.

I claim:

1. An indexing device which comprises a pair of like adjacent polygonal members, said members being mounted on a shaft for rotation thereof, said members being offset from each other by an angle equal to one half of one of the angles of said polygon, a slide reciprocable in a straight line motion in a plane substantially normal to said shaft, a pair of straight cam surfaces spaced from each other on said slide, said surfaces being disposed parallel to each other and perpendicular to the direction of reciprocation of said slide, one of said cam surfaces being positioned to contact the respective outer edges of one of said polygonal members, the other of said cam surfaces being positioned to contact the respective outer edges of the other polygonal member, first and second spring loaded interferences mounted on opposite sides of said slide at an angle to the direction of reciprocation thereof, said first spring loaded interference cooperating with the respective side edges of one of said polygonal members for rotating said one member through an angle equal to one half of one of the angles of said polygon during reciprocation of said slide in one direction, said second spring loaded interference cooperating with the respective side edges of the other polygonal member for rotating said other member through an angle equal to one half of one of the angles of said polygon during reciprocation of said slide in the opposite direction, and means for reciprocating said slide to cause said cam surfaces on said slide to alternately engage a side edge of one of said polygonal members following rotation thereof by said first interference, and a side edge of the other polygonal member following rotation thereof by said second interference.

2. An indexing device which comprises a pair of like adjacent polygonal plates, said plates being mounted on a shaft for rotation thereof, said plates being parallel to each other and normal to said shaft, said plates being offset from each other by an angle equal to one half of one of the angles of said polygon, a slide reciprocable in a straight line motion in a plane substantially normal to said shaft, a pair of straight cam surfaces spaced from each other on said slide at opposite ends of said slide, said surfaces being disposed parallel to each other and perpendicular to the direction of reciprocation of said slide, one of said cam surfaces being positioned to contact the respective outer edges of one of said polygonal members, the other of said cam surfaces being positioned to contact the respective outer edges of the other polygonal member, first and second compression spring loaded interferences mounted on opposite sides of said slide at an angle to the direction of reciprocation thereof, said first spring loaded interference cooperating with the respective side edges of one of said polygonal plates for rotating said one plate through an angle equal to one half of one of the angles of said polygon during reciprocation of said slide in one direction, said second spring loaded interference cooperating with the respective side edges of the other polygonal plate for rotating said other plate through an angle equal to one half of one of the angles of said polygon during reciprocation of said slide in the opposite direction, said first interference being maintained fully extended during rotation of said one polygonal plate while said second interference is simultaneously compressed against a side edge of said other polygonal plate, and vice versa during rotation of said other polygonal plate by said second interference, and means for reciprocating said slide to cause said cam surfaces on said slide to alternately engage in flat abutting relation a side edge of one of said polygonal plates following rotation thereof by said first interference, and a side edge of the other polygonal plate following rotation thereof by said second interference.

3. An indexing mechanism as defined in claim 2, wherein said interferences are each elongated members, and wherein said first interference is positioned in alignment with and alongside a side edge of said one of said polygonal plates and said second interference is positioned closely adjacent and at an angle to the adjacent side edge of said other polygonal plate, when one of said cam surfaces on said slide is in abutting relation with a side edge of one of said polygonal plates.

4. An indexing device which comprises a pair of like adjacent regular polygonal plates, said plates being positioned in closely adjacent parallel planar relation to each other and each mounted centrally on a shaft for rotation thereof, said plates being positioned normal to said shaft and offset from each other by an angle equal to one half of one of the angles of said polygon, a slide having a rectangular central opening and reciprocable in a straight line movement in a plane substantially normal to said shaft, said plates being positioned in said opening, a pair of straight cam surfaces spaced from each other on said slide, said surfaces being disposed parallel to each other and forming the periphery of said opening at opposite ends of said slide, said surfaces being perpendicular to the direction of reciprocation of said slide, one of said cam surfaces being positioned to contact the respective outer edges of one of said polygonal plates, said one of said cam surfaces being free from contact by the respective outer edges of the other polygonal plate, the other of said cam surfaces being positioned to contact the respective outer edges of the other polygonal plate, said other of said cam surfaces being free from contact by the respective outer edges of said one of said polygonal plates, first and second spring loaded interferences mounted on opposite sides of said slide at equal angles to the direction of reciprocation thereof, said first interference cooperating with the respective side edges of one of said polygonal plates for rotating said one plate through an angle equal to one half of one of the angles of said polygon during reciprocation of said slide in one direction, said second interference cooperating with the respective side edges of the other polygonal plate for rotating said other plate through an angle equal to one half of one of the angles of said polygon during reciprocation of said slide in the opposite direction, and means for reciprocating said slide to cause said cam surfaces on said slide to alternately engage a side edge of one of said polygonal plates following rotation thereof by said first interference, and a side edge of the other polygonal plate following rotation thereof by said second interference.

5. An indexing device which comprises a pair of like adjacent regular polygonal plates, said plates being positioned in closely adjacent parallel planar relation to each other and each mounted centrally on a shaft for rotation thereof, said plates being positioned normal to said shaft and offset from each other by an angle equal to one half of one of the angles of said polygon, a slide having a rectangular central opening and reciprocable in a straight line movement in a plane substantially normal to said shaft, said plates being positioned in said opening, a pair of straight cam surfaces spaced from each other on said slide, said surfaces being disposed parallel to each other and forming the periphery of said opening at opposite ends of said slide, said surfaces being perpendicular to the direction of reciprocation of said slide, one of said cam surfaces being positioned to contact the respective outer edges of one of said polygonal plates, said one of said cam surfaces being free from contact by the respective outer edges of the other polygonal plate, the other of said cam surfaces being positioned to contact the respective outer edges of the other polygonal plate, said other of said cam surfaces being free from contact by the respective outer edges of said one of said polygonal plates, first and second spring loaded pins mounted on opposite sides of said slide at equal angles to the direction of reciprocation thereof, said pins being offset from each other in a direction normal to the plane of said slide, so that said first pin cooperates with the respective side edges of one of said polygonal plates for rotating said one plate through an angle equal to one half of one of the angles of said polygon during reciprocation of said slide in one direction, and said second pin cooperates with the respective side edges of the other polygonal plate for rotating said other plate through an angle equal to one half of one of the angles of said polygon during reciprocation of said slide in the opposite direction, and means for reciprocating said slide to cause said cam surfaces on said slide to alternately engage a side edge of one of said polygonal plates following rotation thereof by said first pin, and a side edge of the other polygonal plate following rotation thereof by said second pin.

6. An indexing device as defined in claim 5, wherein the opposite sides of said slide are spaced sufficiently to permit free rotation of the corners of said polygonal plates within the central opening of said slide, and wherein the opposite cam surfaces are spaced apart a distance permitting rotation of said plates during reciprocal movement of said slide, and wherein the inner end surfaces of said slide adjacent the cam surfaces are respectively offset therefrom to form recesses permitting free passage of a corner of one said polygonal plates into one of said recesses when a side edge of the adjacent polygonal plate is in flat contacting engagement with the adjacent cam surface of said slide.

7. An indexing device which comprises a pair of like essentially square plates mounted in closely adjacent side-by-side planar relation, and each mounted centrally on a shaft normal thereto for rotation thereof by said plates, said square plates being offset from each other by an angle of about 45°, a rectangular form of slide reciprocable in a straight line movement in a plane substantially normal to said shaft, a pair of straight cam surfaces spaced from each other at opposite ends of said slide, said cam surfaces being disposed parallel to each other and spaced apart a distance greater than the length of one side of said square plates, said cam surfaces each being normal to the direction of reciprocation of said slide, one of said cam surfaces being positioned to flatly contact the respective outer edges of one of said square plates, said one of said cam surfaces being free from contact by the respective outer edges of the other square plate, the other of said cam surfaces being positioned to flatly contact the respective outer edges of the other square plate, said other of said cam surfaces being free from contact by the respective outer edges of said one of said square plates, first and second spring loaded pins mounted on opposite sides of said slide at equal angles to the direction of reciprocation thereof, said first pin cooperating with the respective side edges of one of said square plates for rotating said one plate and said shaft through an angle of 45° during reciprocation of said slide in one direction, said second pin cooperating with the respective side edges of the other square plate for rotating said other plate in the same direction as the rotation of said one square plate, through an angle of 45° during reciprocation of said slide in the opposite direction, and means for reciprocating said slide to cause said cam surfaces on said slide to alternately engage a side edge of one of said square plates following rotation thereof by said first pin, and a side edge of the other square plate following rotation thereof by said second pin.

8. An indexing device which comprises a pair of like essentially square plates mounted in closely adjacent side-by-side planar relation, and each mounted centrally on a shaft normal thereto for rotation thereof by said plates, said square plates being offset from each other by an angle of about 45°, a slide in the form of a rectangular frame reciprocable in a straight line movement in a plane substantially normal to said shaft, said slide having an essentially square central opening, a pair of straight cam surfaces spaced from each other at opposite ends of said slide, said cam surfaces being disposed parallel to each other and forming the periphery of two opposite sides of said opening, said cam surfaces being spaced apart a distance substantially greater than the length of one side of said square plates, said cam surfaces each being perpendicular to the direction of reciprocation of said slide, one of said cam surfaces being positioned to flatly contact the respective outer edges of one of said square plates, said one of said cam surfaces being free from contact by the respective outer edges of the other square plate, the other of said cam surfaces being positioned to flatly contact the respective outer edges of the other square plate, said other of said cam surfaces being free from contact by the respective outer edges of said one of said square plates, first and second spring loaded slidable pins mounted on opposite sides of said slide and each positioned at a 45° angle to the direction of reciprocation of said slide, said pins being offset from each other in a direction normal to the plane of said slide, said first pin cooperating with the respective side edges of one of said square plates for rotating said one plate and said shaft through an angle of 45° during reciprocation of said slide in one direction, said second pin cooperating with the respective side edges of the other square plate for rotating said other plate in the same direction as the rotation of said one square plate, through an angle of 45° during reciprocation of said slide in the opposite direction, and means for reciprocating said slide to cause said cam surfaces on said slide to alternately engage a side edge of one of said square plates following rotation thereof by said first pin, and a side edge of the other square plate following rotation thereof by said second pin.

9. An indexing device as defined in claim 8, wherein said first pin is positioned in alignment with and alongside a side edge of said one of said square plates and said second pin is positioned closely adjacent and at an angle of 45° to the adjacent side edge of said other square plate, when one of said cam surfaces on said slide is in flat abutting relation with a side edge of said other plate.

10. An indexing device as defined in claim 8, wherein the opposite sides of said slide are spaced sufficiently to permit free rotation of the corners of said square plates within the central opening of said slide, and wherein the opposite cam surfaces are spaced apart a distance permitting rotation of said plates during reciprocal movement of said slide, and wherein the inner end surfaces of said slide adjacent the cam surfaces are respectively offset therefrom to form recesses permitting free passage of a corner of one said square plates into one of said recesses when a side edge of the adjacent square plate is in flat contacting engagement with the adjacent cam surface of said slide.

References Cited in the file of this patent

UNITED STATES PATENTS

| | | |
|---|---|---|
| 852,346 | Porteous | Apr. 30, 1907 |
| 1,075,311 | Beck | Oct. 7, 1913 |
| 1,235,385 | Runnion | July 31, 1917 |
| 2,415,872 | Dostal | Feb. 18, 1947 |